US009692772B2

(12) United States Patent
Hart et al.

(10) Patent No.: US 9,692,772 B2
(45) Date of Patent: Jun. 27, 2017

(54) DETECTION OF MALWARE USING TIME SPANS AND PERIODS OF ACTIVITY FOR NETWORK REQUESTS

(71) Applicant: Symantec Corporation, Mountain View, CA (US)

(72) Inventors: Michael Hart, Brooklyn, NY (US); Darrell Kienzle, Vienna, VA (US); Peter Ashley, Hopkinton, MA (US)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 15/018,758

(22) Filed: Feb. 8, 2016

(65) Prior Publication Data

US 2016/0156640 A1    Jun. 2, 2016

Related U.S. Application Data

(62) Division of application No. 14/226,626, filed on Mar. 26, 2014, now Pat. No. 9,419,986.

(51) Int. Cl.
*H04L 12/26* (2006.01)
*H04L 29/06* (2006.01)
(Continued)

(52) U.S. Cl.
CPC .............. *H04L 63/14* (2013.01); *G06F 21/56* (2013.01); *H04L 63/145* (2013.01); *G06F 2221/034* (2013.01)

(58) Field of Classification Search
None
See application file for complete search history.

(56) References Cited

U.S. PATENT DOCUMENTS 7,487,217 B2    2/2009  Buckingham et al.
7,526,730 B1    4/2009  Cahill
(Continued)

FOREIGN PATENT DOCUMENTS

EP           2611115        7/2013

OTHER PUBLICATIONS

International Search Report and the Written Opinion of the International Searching Authority, PCT/US2015/020763, mailed Jun. 5, 2015.
(Continued)

*Primary Examiner* — Venkat Perungavoor
(74) *Attorney, Agent, or Firm* — Maschoff Brennan

(57) ABSTRACT

A method to identify machines infected by malware is provided. The method includes determining whether a universal resource locator in a network request is present in a first cache and determining whether a fully qualified domain name from the uniform resource locator is present in a second cache. The method includes evaluating a parent hostname as to suspiciousness. The method includes indicating the computing device has a likelihood of infection, responsive to one of: the universal resource locator being present in the first cache with a first indication of suspiciousness, the fully qualified domain name being present in the second cache with a second indication of suspiciousness, or the evaluating the parent hostname having a third indication of suspiciousness, wherein at least one method operation is performed by the processor. A system and computer readable media are provided.

5 Claims, 6 Drawing Sheets

(51) Int. Cl.
*G06F 21/56* (2013.01)
*G06F 21/51* (2013.01)

(56) References Cited

U.S. PATENT DOCUMENTS

| | | |
|---|---|---|
| 7,594,011 B2 | 9/2009 | Chandra |
| 7,769,820 B1 | 8/2010 | Spies et al. |
| 7,979,734 B2 | 7/2011 | Fang et al. |
| 8,205,258 B1 | 6/2012 | Chang et al. |
| 8,229,930 B2 | 7/2012 | Cohen et al. |
| 8,505,094 B1 | 8/2013 | Xuewen et al. |
| 8,510,829 B2 | 8/2013 | Mohandas et al. |
| 8,521,667 B2 | 8/2013 | Zhu et al. |
| 8,555,388 B1 | 10/2013 | Wang et al. |
| 8,677,486 B2 | 3/2014 | Olney et al. |
| 8,756,691 B2 | 6/2014 | Nachenberg |
| 8,776,240 B1* | 7/2014 | Wu .................. G06F 21/567 726/22 |
| 8,914,309 B2 | 12/2014 | Pham et al. |
| 9,231,972 B2 | 1/2016 | Ou et al. |
| 2005/0213768 A1 | 9/2005 | Durham et al. |
| 2007/0005652 A1 | 1/2007 | Choi et al. |
| 2008/0010368 A1* | 1/2008 | Hubbard ........... G06F 17/30864 709/223 |
| 2008/0172738 A1 | 7/2008 | Bates et al. |
| 2010/0287151 A1 | 11/2010 | Mustonen |
| 2010/0318681 A1 | 12/2010 | Shi |
| 2012/0023090 A1* | 1/2012 | Holloway ........... H04L 63/0281 707/709 |
| 2013/0031625 A1 | 1/2013 | Lim |
| 2013/0067115 A1 | 3/2013 | Lapanc |
| 2013/0318603 A1* | 11/2013 | Merza ................. H04L 63/1441 726/22 |
| 2014/0059649 A1* | 2/2014 | Hu ........................ H04L 63/08 726/3 |
| 2014/0089344 A1 | 3/2014 | Hong et al. |
| 2014/0196144 A1* | 7/2014 | Trost .................. H04L 63/1408 726/22 |

OTHER PUBLICATIONS

Sandeep Yadav, Ashwath Kumar Reddy, A.L. Narasimha Reddy and Soups Ranjan; "Detecting Algorithmically Generated Domain-flux Attacks with DNS Traffic Analysis", ACM/IEEE Transactions on Networking, 2012. See http://www.ee.tamu.edu/~reddy/papers/tnet12.pdf.

* cited by examiner

DETECTION OF MALWARE USING TIME SPANS AND PERIODS OF ACTIVITY FOR NETWORK REQUESTS

BACKGROUND

Network requests from machines at endpoints in a network can fall prey to malware of various types. Producers of malware are continually striving to outwit producers of malware detection systems and methods, and vice versa. In various malware detection systems and methods, there is an intrinsic trade-off between accuracy and efficiency. Typically a malware detection method or system consumes system resources such as memory, communication bandwidth, and/or processing bandwidth, in order to increase detection. An efficient method or system would consume less system resources, and have a low rate of false positives in identifying malware. Some malware detection systems check network requests against websites known to distribute malware. However, producers of malware can generate new websites quickly, which may evade such detection.

It is within this context that the embodiments arise.

SUMMARY

A method to identify machines infected by malware is provided. The method includes determining whether a universal resource locator (URL), in a network request from a computing device, is present in a first cache coupled to a processor. The method includes determining whether a fully qualified domain name of the URL is present in a second cache coupled to the processor, in response to determining that the URL is not present in the first cache. The method includes evaluating a parent hostname as to suspiciousness, in response to determining that the fully qualified domain name is not present in the second cache. The method includes indicating the computing device has a likelihood of infection, responsive to one of: the URL being present in the first cache with a first indication of suspiciousness, the fully qualified domain name being present in the second cache with a second indication of suspiciousness, or the evaluating the parent hostname having a third indication of suspiciousness, wherein at least one method operation is performed by the processor.

A non-transitory, tangible, computer-readable media having instructions thereupon which, when executed by a processor, cause the processor to perform a method is provided. The method includes testing for presence of a universal resource locator (URL), referenced by a computing device, in a first cache. The method includes listing the computing device as likely infected, responsive to the first cache having the presence of the URL and having an indication that the URL is suspicious. The method includes extracting a fully qualified domain name from the URL, responsive to lack of presence of the URL in the first cache. The method includes testing for presence of the fully qualified domain name in a second cache and listing the computing device as likely infected, responsive to the second cache having the presence of the fully qualified domain name and having an indication that the fully qualified domain name is suspicious. The method includes assessing a parent hostname as to suspiciousness, responsive to lack of presence of the fully qualified domain name in the second cache and listing the computing device as likely infected, responsive to the assessing indicating that the fully qualified domain name is suspicious.

A system for identifying machines infected by malware is provided. The system includes a first cache configured to store universal resource locators (URLs) and first associated levels of suspiciousness and a second cache configured to store fully qualified domain names and second associated levels of suspiciousness. The system includes a processor coupled to the first cache and the second cache, the processor configured to receive universal resource locators (URLs) from network accesses performed by one or more computing devices being monitored. The processor is configured to perform actions including checking the first cache to see if a URL is present and checking the second cache to see if a fully qualified domain name from the URL is present, responsive to not finding the URL in the first cache. The actions include assigning a level of suspiciousness to a parent hostname, responsive to not finding the fully qualified domain name in the second cache and identifying a computing device as infected, responsive to a result of one or more of the checking the first cache, the checking the second cache, and the assigning the level of suspiciousness.

A method of identifying machines infected by malware is provided. The method includes tracking domain names in network requests from a computing device, for at least a first time span and receiving a fully qualified domain name relating to a network request from the computing device. The method includes determining whether the fully qualified domain name is among the tracked domain names for the at least a first time span and prior to a second time span. The second time span extends to a present time and the first time span extends back in time from a beginning of the second time span. The method includes indicating the computing device has a likelihood of infection, responsive to a result of the determining, wherein at least one method operation is performed by a processor.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
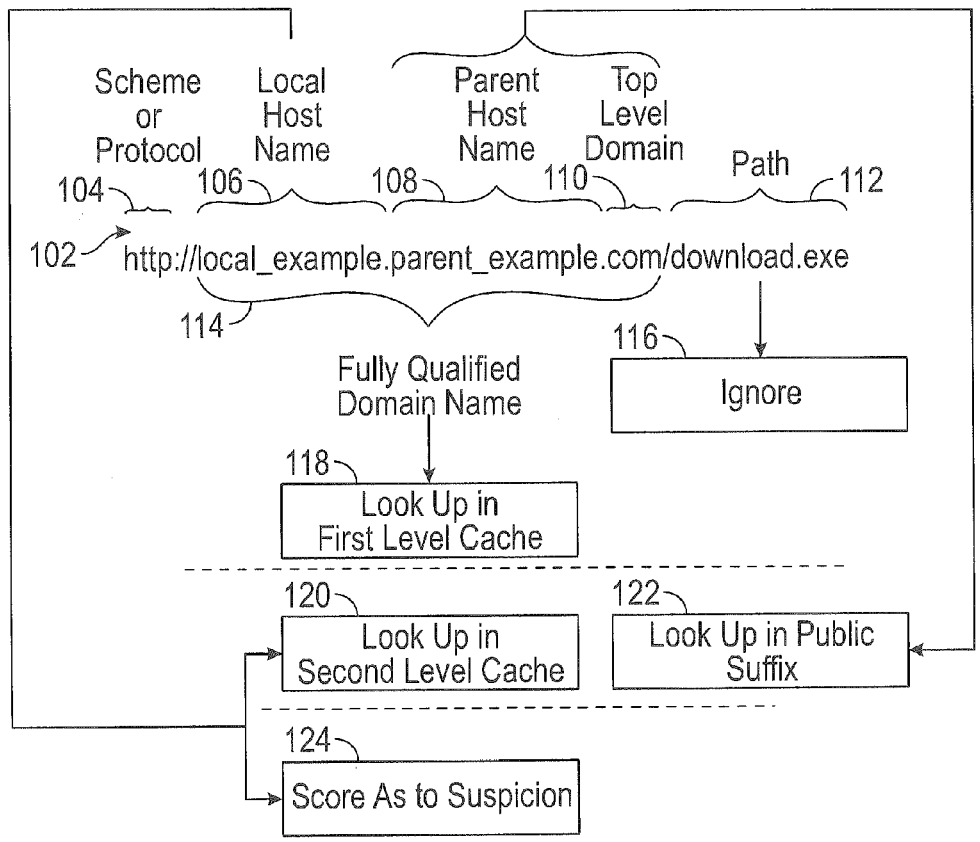
FIG. 1 is a syntax and process diagram, depicting how a universal resource locator (URL) is parsed and operated upon, in order to identify machines infected by malware, in accordance with some embodiments.

Universal resource locators (URLs) from network requests made by machines (i.e., computing devices) at endpoints in a network are collected and analyzed in embodiments of the system and method disclosed herein, in an effort to identify machines infected by malware. In some embodiments, linguistic analysis is applied to the network requests, as portions of the universal resource locators are parsed out and operated upon. As suspicious universal resource locators are identified through use of a multilevel cache, or in some embodiments a single level cache, machines that have a pattern of usage of these suspicious universal resource locators are red-flagged. Upon further analysis of the suspicious universal resource locators referenced by these red-flagged machines, notifications can be issued. Combining identification of suspicious universal resource locators and recognition of these patterns of usage to indicate computing devices suspected of infection by malware reduces incidence of false positives and keeps usage of system resources to a manageable level. FIG. 1, which presents syntax, and FIGS. 2-3C, which present system embodiments, are followed by a discussion of principles and examples of operation through various methods in the flow diagrams of FIGS. 4A-4C.

FIG. 1 is a syntax and process diagram, depicting how a universal resource locator 102 (also known as a web address) is parsed and operated upon, in order to identify machines infected by malware, in accordance with an embodiment of the present disclosure. As will be appreciated, computing devices on networks of various configurations can send network requests over a network in order to access resources of the network, such as websites and downloads, in a format related to that of the example shown in FIG. 1. Typically, the universal resource locator 102 starts with, at the left-hand end, a scheme or protocol 104, which is the set of characters preceding (i.e., followed by) the colon and the double slashes. Examples of schemes or protocols 104 include http (hypertext terminal protocol), https (hypertext terminal protocol secure), ftp (file transfer protocol), among others.

Proceeding to the right, the scheme or protocol 104 and the colon and double slashes are followed by a host, normally given as a domain name, but which could also be given as a literal IP (Internet Protocol) address. After the host, optionally a port number is given as a colon and a number. The host and optional port number are followed by a slash character, i.e., "/. After the slash character, optionally a path 112 is presented, which specifies where within the domain a resource of interest is located. A further option is to have a query string, preceded by a question mark, i.e., "?". If both a path and a query string are applied, the query string follows the path (i.e., is to the right of the path).

The Domain Name System (DNS) translates between the domain name hierarchy and the Internet Protocol address spaces, i.e., translates between domain names and IP addresses. Both the domain name hierarchy and the Internet Protocol address spaces are namespaces. In the domain namespace, syntax is such that each of the one or more parts of a domain name is called a label. The rightmost label is the top-level domain, and the hierarchy operates from right to left, with each label indicating a subdivision or subdomain. Domain names are registered. A query and response protocol, e.g., WHOIS, can be used for querying databases regarding registered users, assignees of Internet resources, domain names, IP address blocks and other information. Results of such a query, and the data, records or database from which the query response originates, are referred to as WHOIS data.

For purposes of the system and method disclosed herein, and with ongoing reference to FIG. 1, the fully qualified domain name 114, also referred to as the absolute domain name, is of interest in some embodiments. The fully qualified domain name 114 is a domain name specifying all domain levels including top-level domain and root zone, such that an exact location is specified in the Domain Name System. The fully qualified domain name 114 is the portion of the universal resource locator 102 between the double slashes and the single slash, and can be obtained by discarding the scheme or protocol 104, the colon and the double slashes, and discarding the single slash and all that follows (i.e. is to the right of) the single slash.

Generally, the fully qualified domain name 114 is a domain name that specifies a top level domain 110 and a hostname, which is a domain name assigned to a host computer. It should be appreciated that all host names are domain names, and many, but not all, domain names are hostnames. The hostname can be just a single name, or can be a parent hostname 108 preceded by a local hostname 106, with a dot, i.e., ".", between the local hostname 106 (to the left of the dot) and the parent hostname 108 (to the right of the dot). The parent hostname 108 would thus be a subdomain of the top-level domain 110, and the local hostname 106 (in fully qualified domain names 114 that have a local hostname 106) would thus be a subdomain of the parent domain or parent hostname 108.

Certain domain name suffixes are catalogued in the Public Suffix List. A public suffix can also be called an effective top-level domain. Examples of public suffixes include is-a-doctor.com, is-very-evil.org, is-very-nice.org, ballooning.aero, k12.ca.us, americanart.museum, blogspot.jp, among many more. It should be appreciated that many public suffixes are associated with a country and that the examples provided above as being representative of the public suffixes are subject to change.

Still referring to FIG. 1, and applying syntax related thereto, a process of operating upon a universal resource locator 102 in accordance with the present disclosure is now described. Since the fully qualified domain name 114 is of interest, the path 112 in the universal resource locator 102 is ignored, and can be removed. The scheme or protocol 104 is also removed. This leaves the fully qualified domain name 114, which is thus extracted from the universal resource locator 102. It should be appreciated that a processor, suitably instructed, can perform this and other actions described herein. In an action 118, the fully qualified domain name is looked up in a first level cache. This description applies to the first level of a process of operating on the universal resource locator 102. If there is a hit, i.e., if the fully qualified domain name 114 is present in the first level cache according to the action 118, further actions can be performed as will be described with reference to FIGS.

2-4C. If there is not a hit, i.e., if the fully qualified domain name 114 is not present in the first level cache according to the action 118, the process moves to the second level.

In the second level of the process, the local hostname 106 is extracted from either the fully qualified domain name 114 or the universal resource locator 102. For example, the local hostname 106 can be extracted by removing the top level domain 110 and the parent hostname 108 from the fully qualified domain name 114, or by removing the scheme or protocol 104, the parent hostname 108, the top-level domain, and the path 112 from the universal resource locator 102. In an action 120, the local hostname 106 is looked up in the second level cache. If there is a hit, i.e., if the local hostname 106 is present in the second level cache according to the action 120, further actions can be performed as will be described with reference to FIGS. 2-4C. If there is not a hit, i.e., if the local hostname 106 is not present in the second level cache according to the action 120, the process moves to the third level. As a further action 122 in the second level, the parent hostname 108 and top-level domain 110 can be looked up in the public suffix list, and further actions, depending on whether or not the parent hostname and top-level domain 110 are present in the public suffix list, can be performed.

In the third level of the process, which is arrived at when the fully qualified domain name 114 is lacking from or absent in the first level cache, and the local hostname 106 is lacking from or absent in the second level cache, the local hostname 106 is scored as to suspicion, in an action 124. Scoring, assessing or evaluating the local hostname 106 as to suspicion can be performed in various ways, in various embodiments. For example, a probabilistic classifier could assign a numerical, character-based, word-based or other type of score to a probability of how suspicious a local hostname 106 is. Such a score could be, for example, zero for not suspicious and one for suspicious (i.e., a binary score or valuation), a numerical score from one through ten or other scale, a letter score, a word-based score such as "low", "medium" or "high", or "not suspicious" and "suspicious" (another version of a binary score) or based on another scale, parameter or expression as readily devised in accordance with the teachings disclosed herein. The score as to suspicion, per the action 124, can be applied in various ways as will be further described with reference to FIGS. 2-4C. Particularly, this score can be used to update the first and second level caches, and machines, i.e., computing devices, which match various patterns of usages of universal resource locators. In some embodiments, scores at a certain level or greater are indicative of suspicious websites or possible malware and can be flagged.

In some embodiments, the scoring as to suspicion is based on whether the local hostname 106 matches rules of pronunciation, such as having recognizable syllables that are readily pronounced. In one embodiment, the scoring as to suspicion is based on the character count or length of the local hostname 106. In one embodiment, the scoring as to suspicion is based on whether the local hostname 106 has numbers, repeated letters or combinations of letters not usually seen in syllables, or other characteristics not usually seen in language-based syllables. In one embodiment, the scoring as to suspicion is based on an evaluation of randomness of the sequence of characters in the local hostname 106 as compared to randomness of characters in sequence in words in a dictionary or other compilation of words or syllables.

In some embodiments, the scoring as to suspicion is based on keeping a list of all universal resource locators 102, the fully qualified domain names 114, or just the parent hostnames 108, in various embodiments, that are visited by a specific machine, or by a group of machines being monitored, over a specified time span. The time span may include an open-ended time span up to the present, or a closed-ended time span up to the present time, or some other predefined time interval. If the universal resource locator 102 being evaluated, the fully qualified domain name 114 being evaluated, the parent hostname 108 being evaluated, or the local hostname 106 being evaluated (in various embodiments) is found on this list longer ago than another, e.g., a second, predefined time interval, such as one week leading up to the present, the scoring mechanism gives a low score of suspicion. Otherwise, if not found on this list longer ago than the second interval, i.e., the visit has only occurred recently and the site has not been visited before, the scoring mechanism gives a high score of suspicion. The score could also be based on how many times a domain or subdomain is visited during this second time span, i.e., how many times recently visited. It follows, in this example, that the first time span extends back longer ago than the beginning of the second time span, and the second time span extends to the present time. In other words, the first time span extends back in time for a beginning of the second time span and the second time span extends to the present time in some embodiments. Embodiments based on this technique assign a high suspicion score to a universal resource locator 102, parent hostname 108, fully qualified domain name 114, or local hostname 106 that is just visited recently, and has not been visited previously. As a result, the embodiments flag domains that are rapidly generated and disappear, which typify certain kinds of malware.

With continuing reference to FIG. 1, a further process of operating upon a universal resource locator 102 in accordance with the present disclosure is provided. In this further process, a first level cache, a second level cache, and a third level cache are employed. In the first level of the process, the universal resource locator 108 is looked up in the first level cache. If there is a hit, i.e., if the universal resource locator 102 is present in the first level cache, further actions can be performed as will be described with reference to FIGS. 2-4C. If there is not a hit, i.e., if the universal resource locator 102 is not present in the first level cache, the process moves to the second level. In the second level of the process, the fully qualified domain name 114 is extracted from the universal resource locator 102, as described above. The fully qualified domain name 114 is looked up in the second level cache. If there is a hit, i.e., if the fully qualified domain name 114 is present in the second level cache, further actions can be performed as will be described with reference to FIGS. 2-4C. If there is not a hit, i.e., if the fully qualified domain name 114 is not present in the second level cache, the process moves to the third level. In the third level of the process, the parent hostname 108 and top-level domain 110 are extracted from the fully qualified domain name 114 or from the universal resource locator 102. The parent hostname 108 and top-level domain 110 are looked up in the third level cache. If there is a hit, i.e., if the parent hostname 108 and top-level domain 110 are present in the third level cache, further actions can be performed as will be described with reference to FIGS. 2-4C. If there is not a hit, i.e., if the parent hostname 108 and top-level domain 110 are not present in the third level cache, the parent hostname 108 and top-level domain 110 are scored as to suspicion, as described above. For example, a probabilistic classifier could score the parent hostname 108 and top-level domain 110, or could score the parent hostname 108 without the top-level domain 110. Results of the scoring are propagated to the third level cache, the second level cache and the first level cache with appropriate updates. For example, the updates could include adding the universal resource locator 102 plus the new score to the first cache, adding the fully qualified domain name 114 plus the new score to the second cache, and adding the parent hostname 108, or the parent hostname 108 with the top level domain 110, plus the new score, to the third cache. It should be appreciated that other variations of the processing of the universal resource locator 102, fully qualified domain name 114, the parent hostname 108 and the top level domain 110 are possible and remain within the scope of the embodiments. In addition, while some of the examples provided herein discuss a two level cache system, the embodiments extend to a three level, or greater level, cache system as described above. It should be further appreciated that in some embodiments the number of cache levels is based on the optimal processing efficiency achieved.

Figure 2:
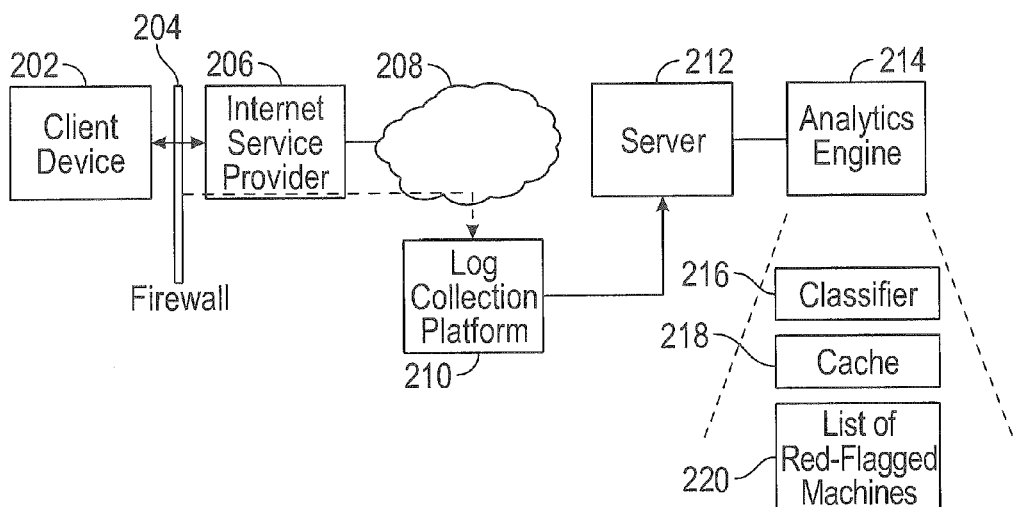
FIG. 2 is a block diagram of a system to identify machines infected by malware in accordance with some embodiments.

FIG. 2 is a block diagram of a system to identify machines infected by malware. A client device 202 (i.e., a computing device or machine) is protected by a firewall 204, and couples to an Internet service provider 206. Through the Internet service provider 206, the client device 202 can access a network 208, such as the global communication network known as the Internet. The firewall 204 communicates with a log collection platform 210, via the Internet service provider 206 and the network 208, and sends one or more logs of universal resource locators 102 to the log collection platform 210. For example, each time the client device 202 sends out a network request with a universal resource locator 102, the firewall 204 writes this universal resource locator 102 to a log in some embodiments. Periodically, after collecting several entries, or in some embodiments more or less immediately, after collecting a single entry, the firewall 204 sends the log to the log collection platform 210. This could be done in a message, such as an email communication, or in a file sent by file transfer protocol, or other mechanism for data transfer over the network 208. As an example, the firewall 204 could be implemented in software on the client device 202, or could be implemented as a service by the Internet service provider 206.

Still referring to FIG. 2, the log collection platform 210 communicates the logs of universal resource locators 102 from the client device 202 and other client devices 202, to a server 212 coupled to, including, or implementing an analytics engine 214. The analytics engine 214, which includes a classifier 216, a cache 218, and a list of red-flagged machines 220, analyzes the logs of universal resource locators 102. This analysis could take the form of the process depicted in FIG. 1, or one or more of the methods depicted in FIGS. 4A-4C, or variations thereof. When the analytics engine 214 identifies a client device 202 suspected of infection by malware, the analytics engine 214 updates the list of red-flagged machines 220, adding information about the client device 202 and the universal resource locators 102 or portions thereof, to the list of red-flagged machines 220. The analytics engine 214 can then further analyze each machine suspected of infection, and particularly can further analyze the universal resource locators 102 or portions thereof for those machines. It should be appreciated that this greatly reduces the computation and resource burden on the analytics engine 214, as compared with analyzing and further analyzing every universal resource locator 102 issuing from every client device 202. Particularly, the cache operations of the first level and the second level greatly reduce how many universal resource locators 102 or portions thereof need to be analyzed with a scoring mechanism to produce a score, since scores are present in the caches. Once a scoring mechanism is applied in the third level, scores are updated to the caches which reduces or eliminates repetition of applying the scoring mechanism. Applying further analysis only to red-flagged machines and the universal resource locators 102 referenced by the red-flagged machines further reduces the computation and resource burden, and further reduces false positives.

Figure 3A:
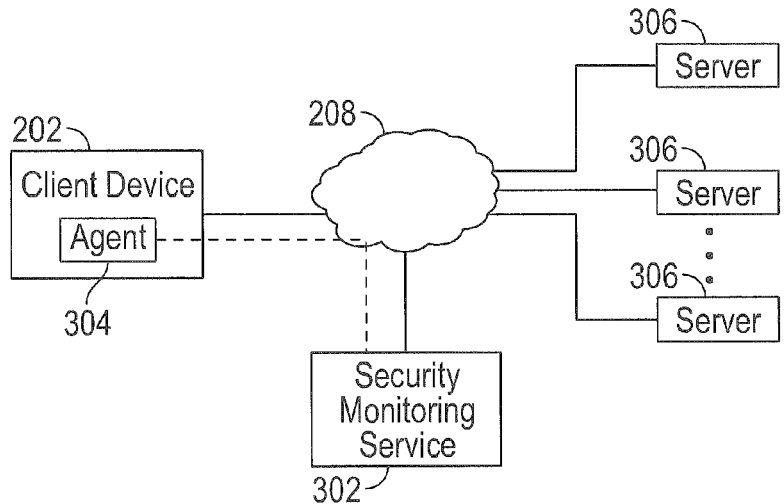
FIG. 3A is a block diagram of an embodiment of the system of FIG. 2, showing a security monitoring service in accordance with some embodiments.
Figure 3B:
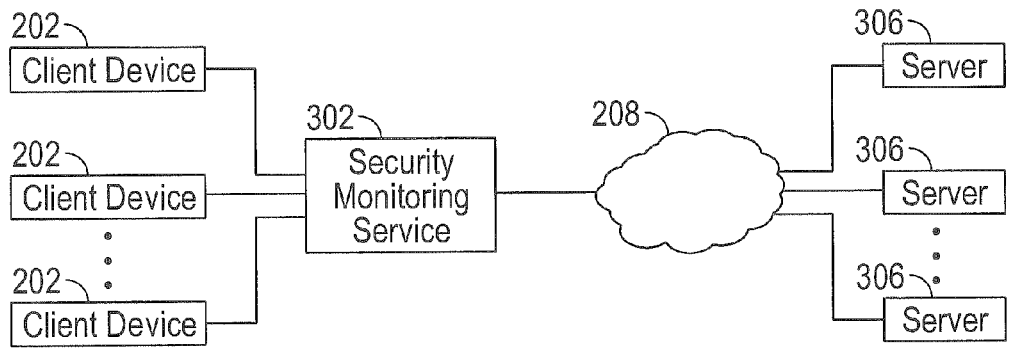
FIG. 3B is a block diagram of a further embodiment of the system of FIG. 2 in accordance with some embodiments.
Figure 3C:
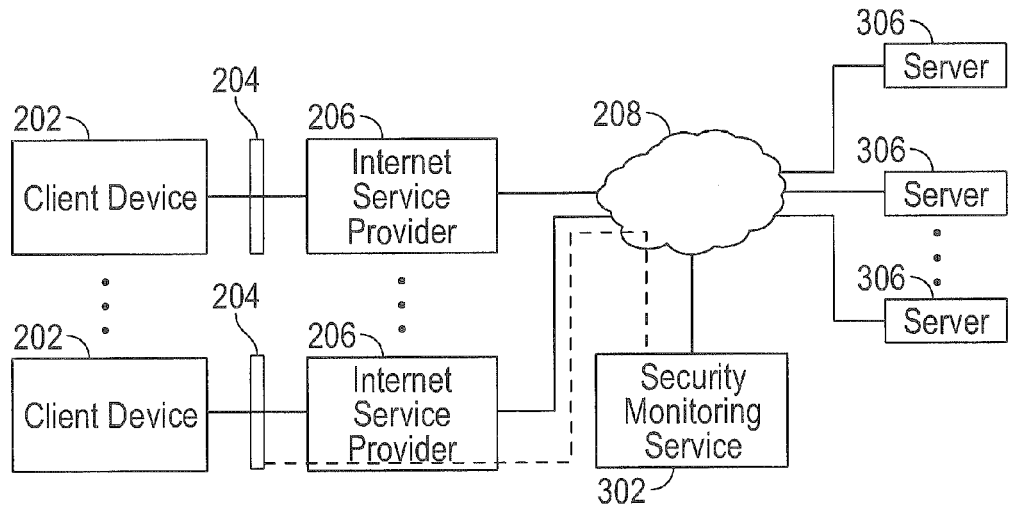
FIG. 3C is a block diagram of a further embodiment of the system of FIG. 2 in accordance with some embodiments.

With reference to FIGS. 3A-3C, various embodiments of the system of FIG. 2 are shown. These embodiments feature a security monitoring service 302, which includes the log collection platform 210, the server 212, the analytics engine 214, the classifier 216, the cache 218, and the list of red flagged machines 220, from FIG. 2, or variations thereof. For example, the security monitoring service 302 and components thereof could be implemented on a portion of a server, or on one or more servers. FIG. 3A is a block diagram of an embodiment of the system of FIG. 2, showing a security monitoring service 302. Here, the client device 202 has an agent 304, which communicates with the security monitoring service 302 via a network 208. The network is coupled to various servers 306. For example, the client device 202 sends out a network request, including a universal resource locator 102, which is routed through the network 208 to one of the servers 306, such as when the user of the client device 202 is web surfing or otherwise using the network 208 to access a server 306. The agent 304, which could be implemented in software executing on the client device 202, collects the universal resource locator 102 and sends the universal resource locator 102 to the security monitoring service 302, via the network 208. Monitoring of universal resource locators 102 and client devices 202 making network requests could be accomplished as a service in a local area network, wireless area network, or intranet, or as a standalone service available over a network, for example by agreement or subscription.

FIG. 3B is a block diagram of a further embodiment of the system of FIG. 2. Multiple client devices 202 are coupled to the security monitoring service 302, for example as a service provider. The security monitoring service 302 is coupled to a network 208, which is coupled to various servers 306. For example, a client device 202 sends out a network request, including a universal resource locator 102, which is routed through the security monitoring service 302, to the network 208 and to a server 306. The security monitoring service 302 grabs or intercepts the universal resource locator 102 from the network request, for analysis. Such analysis could be accomplished as a service provided by a network service provider.

FIG. 3C is a block diagram of a further embodiment of the system of FIG. 2. Multiple client devices 202, each having a firewall 204 and an Internet service provider 206, are coupled via the Internet service providers 206 to a network 208. The network 208 is coupled to various servers 306, and to the security monitoring service 302. Each of the firewalls 204 communicates universal resource locators 102 to the security monitoring service via the respective Internet service provider 206 and the network 208. Monitoring of universal resource locators 102 and client devices 202 could be accomplished using a subscription or other service agreement. Various further arrangements for communicating and monitoring are possible, in accordance with the teachings disclosed herein.

Figure 4A:
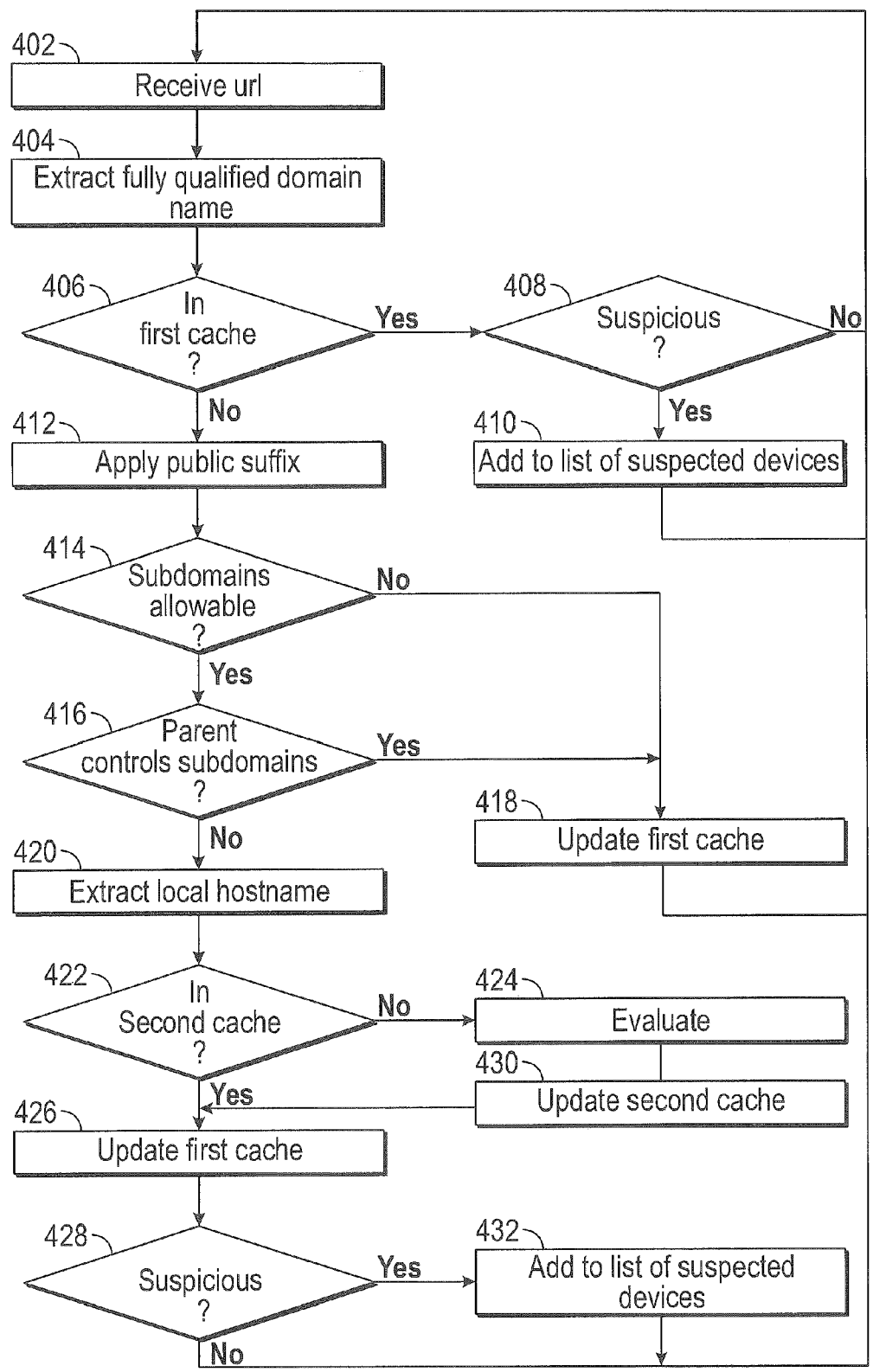
FIG. 4A is a flow diagram of a method of identifying machines suspected of infection, which can be practiced on or using embodiments shown in FIGS. 1-3C in accordance with some embodiments.
Figure 4B:
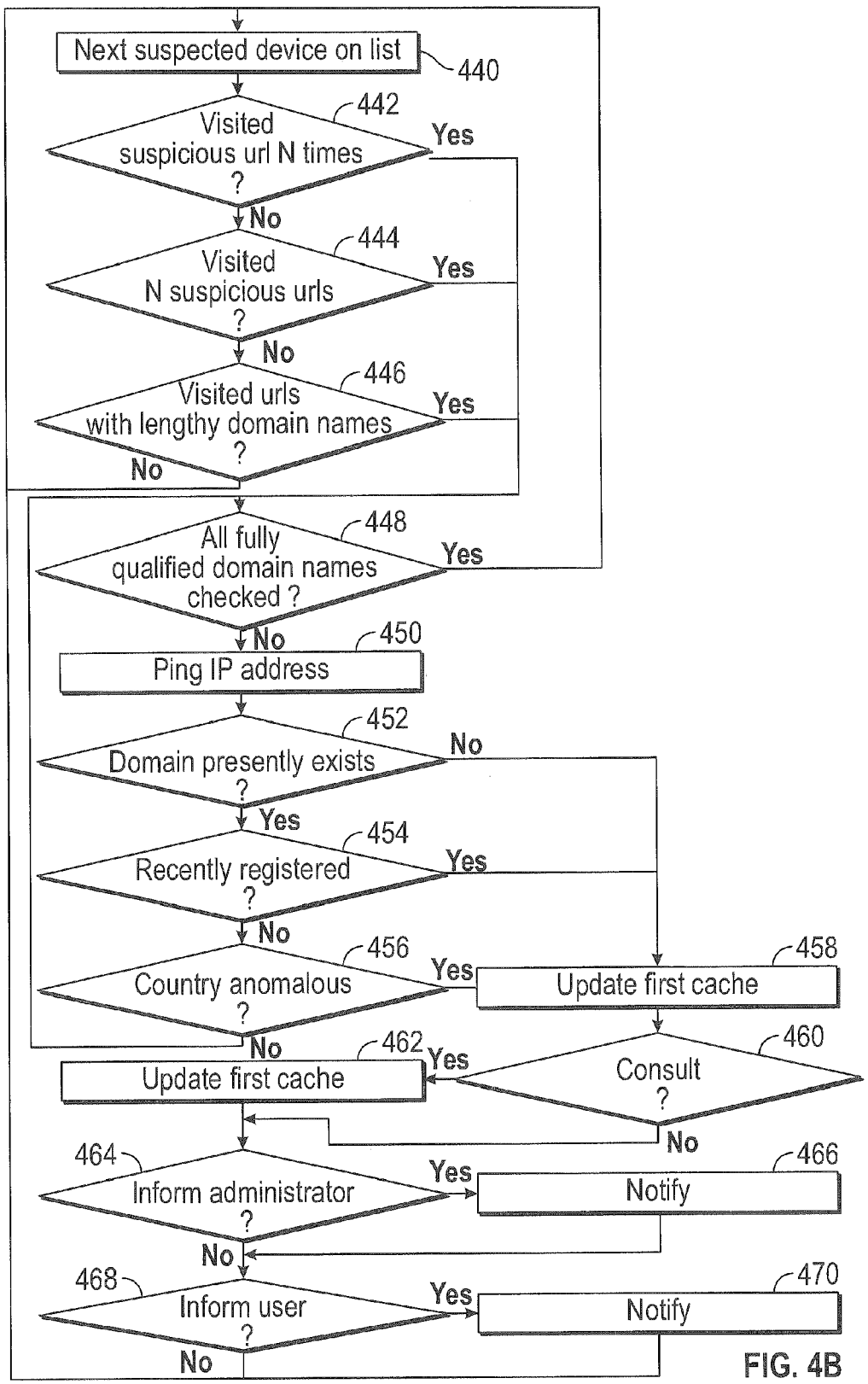
FIG. 4B is a flow diagram of further aspects of the method of identifying machines suspected of infection in accordance with some embodiments.
Figure 4C:
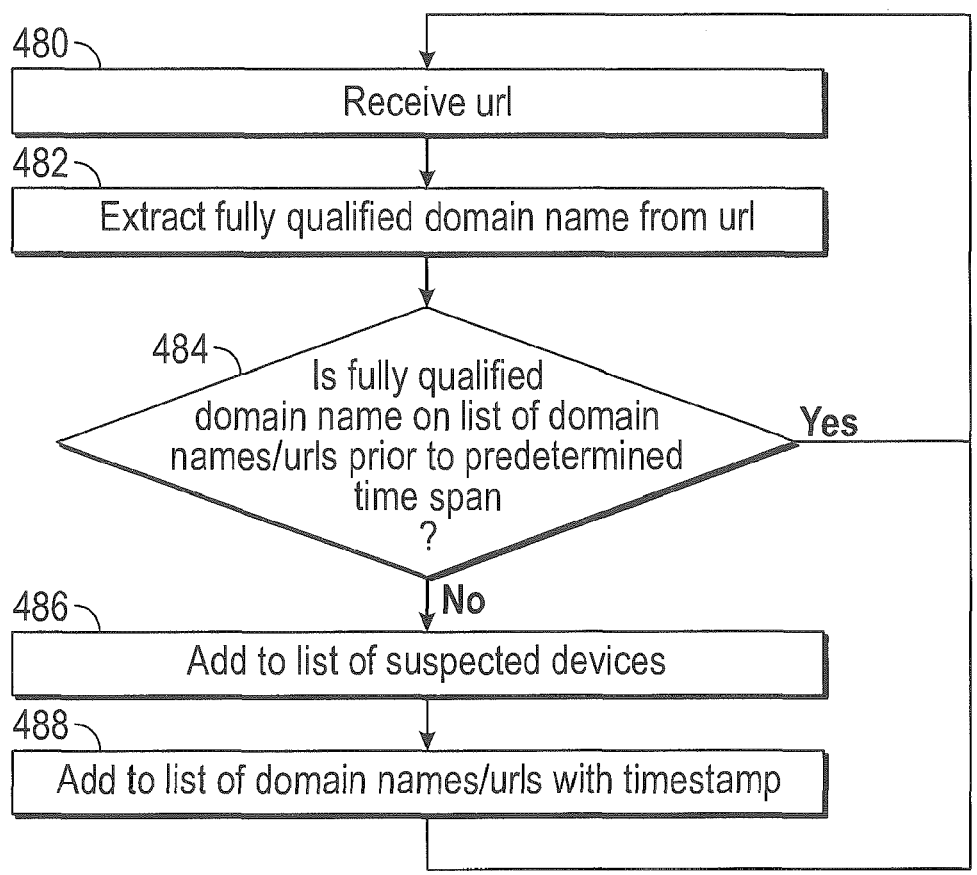
FIG. 4C is a further embodiment of a method of identifying machines suspected of infection, which can be practiced in place of, in addition to, or with various portions of embodiments of the method depicted in FIGS. 4A and 4B in accordance with some embodiments.

With reference to FIGS. 4A-4C, embodiments of a method of identifying machines suspected of infection are shown. These embodiments make use of the syntax discussed with reference to FIG. 1, in the context of analyzing network requests from endpoints. The method can be practiced using a processor, such as a processor in a server or a security monitoring service. Some embodiments make use of a processor in a client device. Examples of implementations of actions of the method are described herein. FIG. 4A is a flow diagram of a method of identifying machines suspected of infection, which can be practiced on or using embodiments shown in FIGS. 1-3C. A universal resource locator is received, in the action 402. For example, the universal resource locator could be received by the log collection platform, from one or more logs from one or more client devices. Universal resource locators could be communicated by a firewall, or by an agent, or collected by a service provider as described above. Universal resource locators could be communicated in the form of a log, or collected directly in a single communication at a time. The fully qualified domain name is extracted, in an action 404. For example, the fully qualified domain name could be extracted from the universal resource locator by ignoring the path and removing the scheme or protocol to leave the fully qualified domain name.

In a decision action 406, the question is asked, is the fully qualified domain name in the first cache? The first cache could include all fully qualified domain names which have had local host names extracted and scored, followed by an update of the first cache in which the fully qualified domain name, or the entire universal resource locator including the fully qualified domain name, is added to the first cache along with the related score, in one embodiment. In a further embodiment, the first cache could include all fully qualified domain names or all universal resource locators including the fully qualified domain names that were visited by the client device prior to a specified time, such as more than one week ago. This could be facilitated by time stamping the universal resource locators or fully qualified domain names, and maintaining a list of all universal resource locators or fully qualified domain names visited by the client device. The list of universal resource locators or fully qualified domain names visited longer ago than a specified time could be derived from the list of all URLs or fully qualified domain names visited by the client device. In one embodiment, a portion of the list of all universal resource locators or fully qualified domain names visited by the client device, with timestamps, is applied to answer the question asked in the decision action 406.

If the answer to the decision action 406 is no, the fully qualified domain name is not present in the first cache, which may be referred to as a cache miss, flow branches to the action 412. If the answer to the decision action 406 is yes, the fully qualified domain name is in the first cache, flow branches to the decision action 408.

In the decision action 408, the question is asked, is the fully qualified domain name suspicious? For example, the first cache could include scores of fully qualified domain names as updated in actions 418 and 426 farther down in the flow diagram. If a score indicates the fully qualified domain name is suspicious, i.e., has an evaluation greater than a specified value, the answer to the question is yes, and flow branches to the action 410. If the score indicates the fully qualified domain name is not suspicious, i.e., has an evaluation lower than a specified value, the answer to the question is no, and flow branches back to the action 402, in order to receive another universal resource locator.

In the action 410, the machine that used the universal resource locator having the suspicious fully qualified domain name is added to a list of suspected devices, such as the list of red-flagged machines maintained by the analytics engine. Further information, such as the universal resource locator having the suspicious fully qualified domain name, or just the suspicious fully qualified domain name, and attendant score, are added to the information associated with the machines suspected of infection, on the list of suspected devices, in some embodiments. This allows further analysis of suspicious universal resource locators, suspicious fully qualified domain names, and the behavior of the suspected devices, as will be further discussed with reference to FIG. 4B. After the action 410, flow branches back to the action 402, in order to receive another universal resource locator.

In the action 412, which is arrived at if the fully qualified domain name is not present in the first cache, the public suffix is applied or obtained. It should be appreciated that the public suffix allows extraction of the local hostname. The public suffix may be obtained through a publically available list in some embodiments. In a decision action 414, the question is asked, are subdomains allowable? This question can be answered in some cases with the application of the public suffix, and in other cases with the use of additional information which could be provided from another database or other public source additional to the public suffix. If the answer is no, subdomains are not allowable, there is less concern that a subdomain could be rapidly generated by a malware producer, and the fully qualified domain name is thus not suspicious or has a low suspiciousness score. Flow branches to the action 418, in order to update the first cache with this information. If the answer is yes, subdomains are allowable, the flow branches to the decision action 416.

In the decision action 416, the question does the parent control the subdomains is asked? This question can be answered in some cases with application of the public suffix, and in other cases with the use of additional information which could be provided from another database or other source. If the answer is yes, the parent controls the subdomains, there is less concern that a subdomain could be rapidly generated by a malware producer, and the fully qualified domain name is thus not suspicious or has a low suspiciousness score. Flow branches to the action 418, in order to update the first cache with this information. If the answer is no, the parent does not control the subdomains, there is concern that this could be a suspicious fully qualified domain name and attendant universal resource locator. Flow then branches to the action 420. It should be appreciated that operation 412 may be considered a routine and operations 414, 416, and 418 may be considered subroutines called upon by the routine in some embodiments.

In the action 418, which is arrived at when it is determined the subdomains are not allowable in action 414, the first cache is updated. For example, the fully qualified domain name or the universal resource locator having the fully qualified domain name could be added to the first cache, along with a low score or other indication of low or lack of suspiciousness in accordance with the results of either the decision action 414 or the decision action 416. Since the level of suspiciousness is low, the machine that employed that universal resource locator and fully qualified domain name deemed to have a low level of suspiciousness is not added to the list of suspected devices.

In the action 420, the local hostname is extracted. This follows the application of the public suffix, which was performed in the action 412. Extraction of the local hostname is further described with reference to FIG. 1. In a decision action 422, the question is asked, is the local hostname in the second cache? If the answer is yes, the local hostname is in the second cache, the flow branches to the action 426, in order to update the first cache with the score as to suspiciousness for the local hostname. If the answer is no, the local hostname is not in the second cache, which may be referred to as a cache miss, the flow branches to the action 424, in order to score the local hostname. In the action 424, the local hostname is evaluated. This could take the form of applying a probabilistic classifier, such as employed in some embodiments in the analytics engine, or another classifier based on various metrics.

In an action 430, the second cache is updated. In some embodiments, the second cache is updated by adding the local hostname and results of the evaluation in the action 424. Flow branches to the action 426, in order to update the first cache. In the action 426, the first cache is updated. The first cache is updated to include the local hostname and the associated score found in the second cache, or assigned in the evaluation of the action 424. For example, the first cache could be updated to include the fully qualified domain name or universal resource locator that includes the local hostname that was found in the second cache or evaluated.

In a decision action 428, the question is asked, is the local hostname suspicious? For example, the second cache or the evaluation could indicate a score greater than a specified value, or a set bit in a suspiciousness flag, or other indicator. It should be appreciated that these same mechanisms could be applied to the first cache as well. If the answer is yes, the local hostname is suspicious, flow branches to the action 432. If the answer is no, the local hostname is not suspicious, flow branches back to the action 402, in order to receive another universal resource locator. In the action 432, the machine that used the universal resource locator having the suspicious fully qualified domain name is added to a list of suspected devices, such as the list of red-flagged machines maintained by the analytics engine. Further information, such as the universal resource locator having the suspicious fully qualified domain name, or the suspicious fully qualified domain name, and attendant score, are added to the information associated with the machines suspected of infection, on the list of suspected devices, in some embodiments. This allows further analysis of suspicious universal resource locators, suspicious fully qualified domain names, and the behavior of the suspected devices, as will be further discussed with reference to FIG. 4B. After the action 432, flow branches back to the action 402, in order to receive another universal resource locator and repeated as described above.

Results of various iterations of the flow shown in FIG. 4A are an updated first cache, an updated second cache, and a populated list of suspected devices. In some embodiments, the populated list of suspected devices includes further information, such as a list for each suspected device of which universal resource locators were sent in network requests, i.e., visited. This further information could also include timestamps for each of the universal resource locators, so that further processing can be performed according to usage patterns per machine over time. The list of suspected devices, and the further contents thereof, can be processed in the flow of FIG. 4B described below.

FIG. 4B is a flow diagram of further aspects of the method of identifying machines suspected of infection. This flow of assumes that there is a list of suspected devices, i.e., computing devices suspected of infection by malware. Such a list can be produced by the method depicted in FIG. 4A, or the method depicted in FIG. 4C, or further variations thereof. Flow starts with the action 440 of FIG. 4B, for the first suspected device on the list, or for a randomly selected or otherwise selected device on the list. The sequence of devices presented from the list could be a numerical sequence, a random sequence, a qualified sequence based on aspects of behavior, or a systematic sequence based on some algorithm. In the action 440, the next suspected device on the list is presented. For example, from the list of red flagged machines, a device suspected of infection by malware could be selected.

In the decision action 442, the question is asked, has the suspected device visited a suspicious universal resource locator a specified number of times? If the answer is no, e.g., the device has visited no suspicious universal resource locators, or has visited the suspicious universal resource locator fewer than the specified number of times, flow branches to the decision action 444. If the answer is yes, e.g., the device has visited the suspicious universal resource locator at least the specified number of times, the flow branches to the decision action 448, in order to check the fully qualified domain names. In the decision action 444, the question is asked, has the suspected device visited a specified number of suspicious universal resource locators? If the answer is no, e.g., the device has visited no suspicious universal resource locators or has visited fewer than a specified number of suspicious universal resource locators, flow branches to the decision action 446. If the answer is yes, e.g., the device has visited at least the specified number of suspicious universal resource locators, flow branches to the decision action 448, in order to check the fully qualified domain names.

In the decision action 446, the question is asked, has the suspected device visited universal resource locators with lengthy domain names? For example, a character count could be specified, and a length exceeding this character count could be flagged. If the answer is no, flow branches back to the action 440, in order to look at the next suspected device on the list of devices suspected of infection by malware. If the answer is yes, flow branches to the action 448, in order to check the fully qualified domain names.

In the decision action 448, which is arrived at if a suspected device on the list of suspected devices has a history of visiting suspicious universal resource locators per the positive answer to one or more of the questions posed in the decision actions 442, 444, and 446, the question is asked, are all the fully qualified domain names checked? This question is at the head of a loop in which each of the fully qualified domain names visited by a suspected device, according to the information in the suspected device list, is checked. If the answer is yes, all of the fully qualified domain names visited by the suspected device of been checked, flow branches back to the action 440, in order to look at the next suspected device on the list of suspected devices. If the answer is no, the fully qualified domain names visited by the suspected device have not all been checked, flow branches to the action 450. It should be appreciated that further embodiments may use other mechanisms for establishing iterative loops of this nature.

In the action 450, the Internet Protocol (IP) address corresponding to the fully qualified domain name is pinged. In some embodiments this employs a procedure called a ping (also called a network ping), which checks to see if there is a device that responds to the ping. In a decision action 452, the question is asked, does the domain presently exist? The answer to this question is determined by the results of the ping, from the action 450. A reply from the ping confirms existence of the device. A lack of response or reply to the ping means the device does not presently exist. If the answer is no, the domain does not presently exist, this is suspicious and possibly indicative of a supplier of malware that creates domains. It should be appreciated that the supplier of malware makes these domains disappear rapidly so that the domains cannot be traced and malware detection services are less likely to catch on and list these domains as known spreaders of malware. If the answer is no in operation 452, flow branches to the action 458, in order to update the first cache. If the answer is yes in operation 452, the domain presently exists, and is less suspicious, the action branches to the decision action 454.

In the decision action 454, the question is asked, is the domain recently registered? A recently registered domain is suspicious, and should have an elevated suspiciousness score. If the answer is yes, the domain is recently registered, flow branches to the action 458, in order to update the first cache. If the answer is no, the domain is not recently registered, this is less suspicious, and the action branches to the decision action 456. In the decision action 456, the question is asked, in the fully qualified domain name is the country anomalous with respect to the suspected device? For example, if the suspected device has a history of visiting websites in a particular country, and the fully qualified domain name originates in the same country, this would not be suspicious. But, if the suspected device has not visited websites in a particular country, and the fully qualified domain name originates in some country that is not regularly visited by the suspected device, this is suspicious, and should have an elevated suspiciousness score. If the answer is yes in action 456, the country is anomalous, flow branches to the action 458, in order to update the first cache. If the answer is no in action 456, the country is not anomalous, the flow branches back to the decision action 448, in order to look at the next fully qualified domain name, from the information on the suspected device list pertaining to the particular suspected device being looked at.

As noted above in action 458 the first cache is updated to add an indication of suspiciousness according to the answer to one or more of the questions in the decision actions 452, 454, and 456, in the information regarding the fully qualified domain name being looked at, for the suspected device. Flow branches to the decision action 460, as now there is relatively strong suspicion for the device being infected by malware. In the decision action 460, the question is asked, should an analyst or a service be consulted? Since consulting an analyst or service as to whether a fully qualified domain name is suspicious is an expensive action, this question is generally considered for suspected devices that have been filtered, i.e., a subset of the devices originally placed on the list of suspected devices. If the answer is no in action 460, there should be no consultation, the flow branches to the decision action 464. If the answer is yes in action 460, there should be consultation, flow branches to the action 462. In the action 462, the first cache is updated with the results of the consultation. Particularly, the first cache could be updated to indicate a high or low level of suspicion for a fully qualified domain name or associated universal resource locator, based on the consultation.

In the decision action 464, the question is asked, should the administrator be informed? If the answer is yes, flow branches to the action 466, in which the administrator is notified that the machine in question is suspected of being infected by malware. If the answer is no, flow branches to the decision action 468. In the decision action 468, the question is asked, should the user be informed? If the answer is yes, the user is notified, in an action 470, that the machine in question is suspected of being infected by malware. If the answer is no, flow branches to the action 440, to look at the next suspected device on the list of devices suspected of infection by malware. In some embodiments, user notification includes showing one or more universal resource locators, from the appropriate list, to the user, and asking if the user clicked on or typed in these universal resource locators.

It should be appreciated that the questions in the flow depicted in FIG. 4B can be rearranged, and in some embodiments one or more questions are omitted, and in further embodiments, additional questions are asked. In various embodiments of the flow depicted in FIG. 4B, each of the devices on the list of suspected devices is looked at, and each of the fully qualified domain names listed in the information for each device is looked at, to identify patterns of usage for the device. Devices that continue to appear suspicious are then looked at further. The first cache is updated as new information is generated based on asking various questions. Decisions of whether or not to consult, and whom to inform, are based on the results of asking the additional questions. By applying various filters in various orders, the number of false positives is reduced. By updating the first cache, the computation burden for further universal resource locators and assessment thereof is reduced.

FIG. 4C is a further embodiment of a method of identifying machines suspected of infection, which can be practiced in place of, in addition to, or with various portions of embodiments of the method depicted in FIGS. 4A and 4B. In one embodiment, the method depicted in FIG. 4C is practiced, in order to generate a list of suspected devices. This is followed by practicing the method depicted in FIG. 4B, to filter the list of suspected devices and produce notifications. The method in FIG. 4C begins with the action 480 where a universal resource locator is received. In some embodiments, the URL could be received from a computing device in a manner similar to that of the action 402 in the method depicted in FIG. 4A.

In an action 482, the fully qualified domain name is extracted from the universal resource locator. This could be performed similarly to the action 404, in the method depicted in FIG. 4A. In a decision action 484, the question is asked, is the fully qualified domain name on a list of domain names or universal resource locators that were visited prior to a predetermined time span, for a computing device in question? For example, a list of all domain names or universal resource locators visited by a computing device in question could be maintained, along with timestamps. From this list, a list of domain names or universal resource locators visited prior to a predetermined time span, by the computing device, could be derived. In other embodiments, the newly arriving domain name or universal resource locator, with timestamp, could be compared to the list of all domain names or universal resource locators visited by the computing device, with timestamps. As a specific example, a list could be derived of domain names or universal resource locators visited longer than one week ago, or one month, or some other time span. The list could be an open-ended or closed-end list. If the answer is yes, the fully qualified domain name is on such a list prior to the predetermined time span, this is not suspicious, and the flow branches back to the action 480, in order to receive another universal resource locator.

If the answer is no in action 484, the fully qualified domain name is not on such a list prior to the predetermined time span, this may be indicative of a suspicious URL, as the fully qualified domain name could be one of those domains that is rapidly generated by purveyors of malware and flow branches to the action 486.

In the action 486, the computing device in question is added to a list of suspected devices. This could be implemented in a manner similar to that of the actions 410 and 432 in the method depicted in FIG. 4A. Flow continues to action 488 where the fully qualified domain name (not found on the list of sites visited longer ago than the specified time span), or the associated universal resource locator, is added along with a timestamp to the list of all domain names or universal resource locators visited by the device in question. From there, after the specified time span, the fully qualified domain name or the universal resource locator, along with a timestamp, could be moved, or copied to the list of domain names or universal resource locators visited longer ago than the specified time span. Flow then branches to the action 480, in order to receive another universal resource locator.

It should be appreciated that the actions 486 and 488 could be performed in either order. Embodiments of the method shown in FIG. 4C flag a device as suspected of infection by malware if the device uses a fully qualified domain name in a recent time span, when the device has not used that fully qualified domain name prior to that recent time span. This is computationally efficient, likely more so than applying a probabilistic classifier. It should be appreciated that false positives can then be reduced by applying the method depicted in FIG. 4B, or variations thereof. In addition, false positives can be further reduced by applying combinations of the methods in FIGS. 4A, 4B and 4C.

Embodiments described herein may be suitable for use in the SYMANTEC MANAGED SECURITY SERVICES™, SYMANTEC ENDPOINT PROTECTION™, DATA LOSS PREVENTION™, and other products of the assignee. In addition, the embodiments may be integrated into endpoint agents for consumer or enterprise usage. The embodiments may be integrated with the GLOBAL INTELLIGENCE SERVICES™ of the assignee and the incident and event data logs from the GLOBAL INTELLIGENCE SERVICES™ may be utilized with the log collection platform of FIG. 2 in some embodiments. Embodiments are useful on machines connecting to a network, so that traffic to and from the machine can be seen, monitored and analyzed. Various linguistic analysis tools can be applied to scoring, i.e., assessing or evaluating, secondary level domains as to suspiciousness, etc. Some embodiments disclosed herein focus on machines that issue network requests in which domains are flagged as suspicious. In some embodiments, for every network request that passes through a security monitoring service, a suspiciousness score can be retrieved from a cache or computed. For those network requests that are flagged as containing a suspicious domain name, the system associates the machine issuing the request and the universal resource locator.

Versions of the caching architecture disclosed herein avoid duplicate computations of the universal resource locator reputation. In some embodiments, the caching architecture employs three tiers of operations. The first tier caches universal resource locator reputation based on the entire universal resource locator, more specifically based on the fully qualified domain name. This first level is informed by empirical measurements of customer data, in that universal resource locators may be requested repeatedly in a recent window of activity. The second tier caches the local hostname, from the fully qualified domain name. The third tier looks at the local hostname, if not found in the cache at the second tier. Caches are updated accordingly. This cache configuration yields considerable minimization of time required to process requests.

In some embodiments, a probabilistic classifier computes a probability using a machine learning classifier, which measure several features. Some of the features, such as keyword splitting and language modeling, are computation and memory intensive. The use of the caches decreases the number of these evaluations, and reduces computation load. This is accomplished by looking at features in various orders so that an early determination of suspicion or lack of suspicion can be made without having to perform a full computation. For example, in some embodiments, a log probability of the language model above −1.4 suggest that a domain was not created by a process such as Domain Generation Algorithms employed by worms.

Worms and other malware sometimes use a process called Domain Generation Algorithms, which the embodiments described herein are designed to recognize. In one embodiment, a first filter identifies infected machines using the following threshold. Systems are flagged that request more than N suspicious domains in some time period T, with the suspicious domains having a length of at least L, and a suspiciousness score exceeding S. Values of L, N, S and T can be chosen to optimize detection and false-positive rates, and may be adjusted dynamically in some embodiments. Applying the above as a filter matches the detection capabilities of the system to the network behavior of certain types of malware. For example, many Trojans, scareware, ransomware and worms cycle through multiple domains where characters are chosen at random (e.g., a7huanamkp.com). Infected machines typically try to access their malicious payloads by contacting several or many of these domains in a short period of time. Therefore, the variables N and T help identify this behavior. The S threshold eliminates borderline detections (e.g., a probability of being suspicious of 51% or so).

Even if a domain has length at least L, and a suspiciousness score exceeding S, flagging such a domain could still create a false positive, which should not be included in the final tally of suspicious names for a machine. Checks are applied to domains requested by a machine identified as likely infected, to further reduce false positives. Such checks may be computationally, memory, or time intensive and are thus applied to a machine with a possible infection, and not to machines that are not so identified.

Checks applied to domains requested by a machine identified as likely infected can include one of, or various combinations of the following. If an Internet Protocol address is pinged, and the result indicates the domain no longer exists, this is indicative of a suspicious URL. This rule is motivated by the observation that Domain Generation Algorithms issue requests that are not guaranteed to succeed. If a universal resource locator reputation service is consulted, and a result of such consultation is that a universal resource locator or portion thereof is suspicious or has no record of a domain, this should elevate suspicion. If requests for a particular website have occurred at least a week ago, or longer ago than some specified time interval, this should lower suspicion. This rule is based on an observation that some marketing websites use domains that are not readable by humans (e.g., Adrotator.se uses domains such as 0aac4e6a54c170b0.se). However, if such an unreadable (i.e., not readily readable as a spoken word by humans except by pronouncing the characters) domain name has been seen for a considerably long time relative to an average malware site, this should not raise suspicion. Patterns in WHOIS data can also be used to raise incidence or downgrade universal resource locator reputation classifications. If a domain is found to be registered only recently, and/or a country of origin is anomalous given a machine of interest, an incident can be raised based on the universal resource locator reputation classification. These and other rules are subject to current behavior of malware authors and may change. However, registration of large numbers of domains to purport malicious activities usually forces malicious entities to use some sort of automation that yields patterns in the registration of domains. Analysts can discover these patterns and apply them to rules suitable for the presently disclosed system. Results of such additional checks should subsequently be cached for future use. Checks that indicate that a domain is not suspicious may result in the domain being whitelisted (e.g., one or more caches may be updated to indicate a low or zero level of suspicion for such a domain). After eliminating domains that may be false positives, the count of suspicious domains for a particular machine of interest can be revised. If this count still exceeds N, the machine is likely infected.

Figure 5:
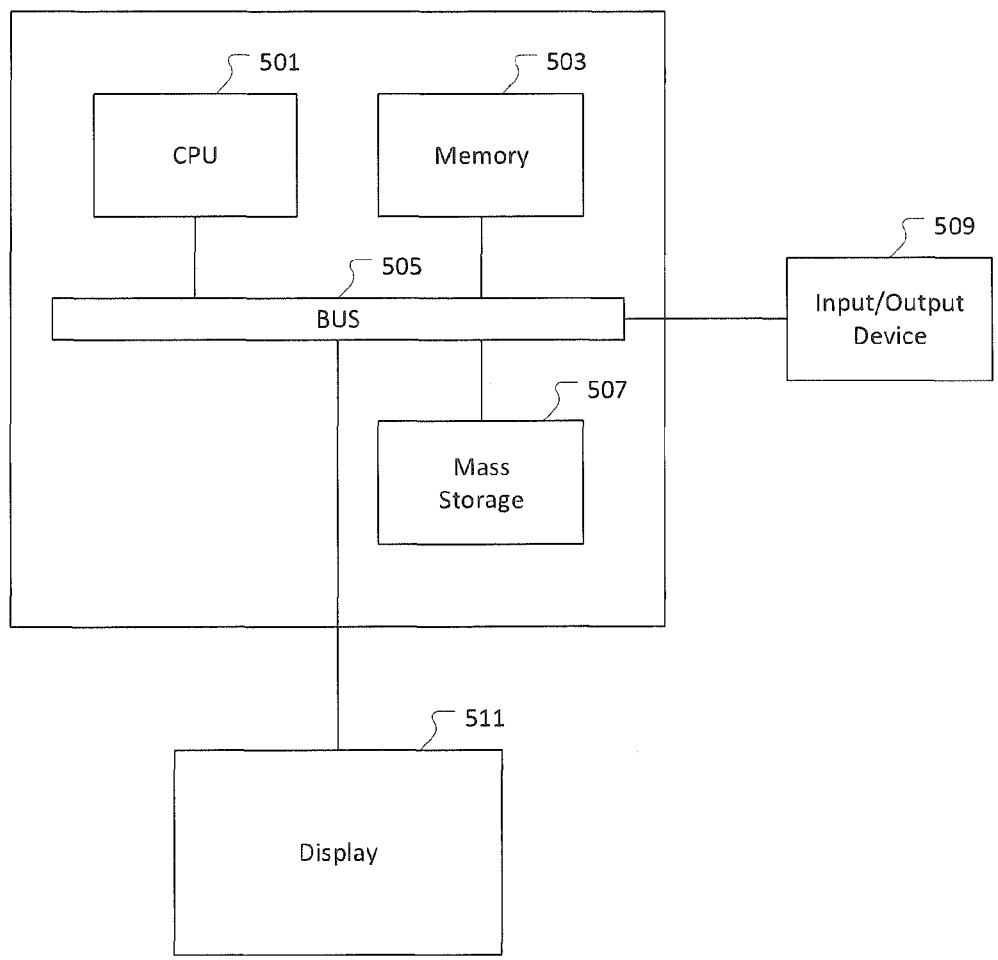
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for monitoring universal resource locators, and identifying machines suspected of being infected by malware in accordance with some embodiments. The computing device includes a central processing unit (CPU) 501, which is coupled through a bus 505 to a memory 503, and mass storage device 507. Mass storage device 507 represents a persistent data storage device such as a disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of identifying machines infected by malware, performed by a security monitoring computing device, the method comprising:

tracking domain names in network requests from a computing device, the tracking occurring over a first time span;

receiving a fully qualified domain name relating to a network request from the computing device;

determining whether the fully qualified domain name is among the tracked domain names and whether the fully qualified domain name was visited during a more recent second time span;

indicating the computing device has a likelihood of infection, responsive to a result of the determining;

determining whether the fully qualified domain name exceeds a predetermined length; and elevating a level of suspicion of the computing device responsive to the result of the determining whether the fully qualified domain name exceeds a predetermined length.

2. The method of claim 1, wherein tracking the domain names includes adding the fully qualified domain name, along with a timestamp, to a list of tracked domain names.

3. The method of claim 1, further comprising:

adding the computing device to a list of computing devices suspected of infection by malware, responsive to the result of the determining.

4. The method of claim 1, further comprising:

further determining whether the computing device has issued a plurality of network requests greater in number than a specified value, each of the plurality of network requests including the fully qualified domain name, during the second time span; and elevating a level of suspicion of the computing device responsive to the result of the further determining.

5. The method of claim 1, further comprising:

determining whether the fully qualified domain name includes a reference to a country that is anomalous to the computing device per the tracking elevating a level of suspicion of the computing device responsive to the result of the determining whether the fully qualified domain name includes a reference to a country that is anomalous to the computing device per the tracking.

* * * * *